United States Patent
Novotny et al.

(10) Patent No.: US 12,111,957 B2
(45) Date of Patent: Oct. 8, 2024

(54) SOFTWARE PROVENANCE VALIDATION

(71) Applicant: Microsoft Technology Licensing, LLC, Redmond, WA (US)

(72) Inventors: Claire Novotny, New York, NY (US); Jared Parsons, Kirkland, WA (US); Jason R. Shaver, Redmond, WA (US); Jobst-Immo Landwerth, Redmond, WA (US); Richard Steele Gibson, Covington, WA (US); Tomas Matousek, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 793 days.

(21) Appl. No.: 17/342,451

(22) Filed: Jun. 8, 2021

(65) Prior Publication Data
US 2022/0391541 A1 Dec. 8, 2022

(51) Int. Cl.
*H04L 9/00* (2022.01)
*G06F 8/41* (2018.01)
*G06F 8/71* (2018.01)
*G06F 21/57* (2013.01)
*G06F 21/64* (2013.01)

(52) U.S. Cl.
CPC .............. *G06F 21/64* (2013.01); *G06F 8/41* (2013.01); *G06F 8/71* (2013.01); *G06F 21/57* (2013.01)

(58) Field of Classification Search
CPC ... G06F 21/64; G06F 8/41; G06F 8/71; G06F 8/57
USPC .......................................................... 726/26
See application file for complete search history.

(56) References Cited

U.S. PATENT DOCUMENTS

| | | |
|---|---|---|
| 2007/0065021 A1 | 3/2007 | Delgrosso et al. |
| 2008/0244516 A1 | 10/2008 | Meijer et al. |
| 2008/0298647 A1 | 12/2008 | Orr et al. |
| 2009/0019285 A1* | 1/2009 | Chen ............... G06F 21/575 713/175 |
| 2009/0106558 A1 | 4/2009 | Delgrosso et al. |
| 2011/0167088 A1 | 7/2011 | Warren et al. |

(Continued)

OTHER PUBLICATIONS https://dwheeler.com/trusting-trust/dissertation/wheeler-trusting-trust-ddc.pdf ; David A. Wheeler; 2009 (Year: 2009).*

(Continued)

*Primary Examiner* — Christopher J Brown
(74) *Attorney, Agent, or Firm* — Ogilvie Law Firm

(57) ABSTRACT

Software provenance validation reports whether a validation binary matches the source code, resources, and other parts, as well as the compiler, runtime, operating system, and other context, which is specified in a provenance manifest for a release binary. Part context checksums, software versions, tool parameters, and other aspects of a build are checked. Certification signatures, timestamps, certain version differences, source code locations, and other data may be ignored for validation purposes. A provenance manifest may include other provenance manifests, including binary rewrite manifests. The provenance manifest may be stored in a debugger file with symbol information, or stored separately. Partial matches may be reported, with details of what matches or does not match. After provenance of a binary is validated, the binary's source code can be analyzed for vulnerabilities, thereby enhancing software supply chain security.

20 Claims, 3 Drawing Sheets

(56) References Cited

U.S. PATENT DOCUMENTS

| | | | |
|---|---|---|---|
| 2012/0210300 A1 | 8/2012 | Trofin et al. | |
| 2014/0108438 A1 | 4/2014 | Duffy et al. | |
| 2014/0195563 A1 | 7/2014 | Katzenberger et al. | |
| 2014/0196008 A1 | 7/2014 | Duffy et al. | |
| 2014/0196015 A1 | 7/2014 | Parsons et al. | |
| 2014/0282448 A1 | 9/2014 | Duffy et al. | |
| 2014/0380275 A1 | 12/2014 | Trofin et al. | |
| 2015/0324175 A1 | 11/2015 | Duffy et al. | |
| 2017/0046134 A1* | 2/2017 | Straub | G06F 21/64 |
| 2018/0074819 A1 | 3/2018 | St. John et al. | |
| 2018/0260198 A1 | 9/2018 | Hamby et al. | |
| 2018/0260304 A1 | 9/2018 | Matousek et al. | |
| 2018/0270161 A1 | 9/2018 | Popescu et al. | |
| 2018/0359096 A1* | 12/2018 | Ford | H04L 9/3247 |
| 2019/0097965 A1 | 3/2019 | Linari et al. | |
| 2019/0228099 A1 | 7/2019 | Bajaj et al. | |
| 2020/0150985 A1 | 5/2020 | Moghaddam et al. | |
| 2020/0183667 A1 | 7/2020 | Warren et al. | |
| 2020/0242266 A1 | 7/2020 | Klein et al. | |
| 2020/0252343 A1 | 8/2020 | Popescu et al. | |
| 2021/0216636 A1* | 7/2021 | Devries | G06F 8/65 |

OTHER PUBLICATIONS

"Dotnet / designs", Retrieved from: https://github.com/dotnet/designs/commits/main/accepted/2020/reproducible-builds.md, Retrieved Date: Apr. 30, 2021, 1 Page.

Claburn, Thomas, "Check your repos . . . Crypto-coin-stealing code sneaks into fairly popular NPM lib (2m downloads per week)", Retrieved from: https://www.theregister.com/2018/11/26/npm_repo_bitcoin_stealer/, Nov. 26, 2018, 12 Pages.

Gibson, et al.,".NET and Terrapin Process", Retrieved from: https://github.com/dotnet/roslyn/blob/main/docs/compilers/terrapin.md, Retrieved Date: Apr. 30, 2021, 8 Pages.

Novotny, et al., "Reproducible Build Validation", retrieved from <<https://github.com/dotnet/designs/commits/main/accepted/2020/reproducible-builds.md>>, Dec. 10, 2020, 9 pages.

Parsons, ".NET and Terrapin Process", retrieved from <<https://github.com/dotnet/roslyn/blob/main/docs/compilers/terrapin.md>>, Feb. 18, 2021, 7 pages.

"Build manifest", retrieved from <<https://docs.unity3d.com/Manual/UnityCloudBuildManifest.html>>, May 15, 2021, 3 pages.

"Configure your build", retrieved from <<https://developer.android.com/studio/build>>, May 18, 2021, 16 pages.

"Gradle", retrieved from <<https://en.wikipedia.org/wiki/Gradle>>, Apr. 19, 2021, pages.

"CompilerParameters Class", retrieved from <<https://docs.microsoft.com/en-us/dotnet/api/system.codedom.compiler.compilerparameters?view=net-5.0>>, retrieved May 18, 2021, 9 pages.

"Checksum", retrieved from <<https://en.wikipedia.org/wiki/Checksum>>, Apr. 26, 2021, 4 pages.

"Microsoft Terrapin", retrieved from <<https://github.com/microsoft-thirdparty>>, no later than May 19, 2021, 1 page.

"Microsoft/Oryx", retrieved from <<https://github.com/microsoft/Oryx>>, no later than May 19, 2021, 5 pages.

"Reproducible builds", retrieved from <<https://en.wikipedia.org/wiki/Reproducible_builds>>, Feb. 14, 2021, 2 pages.

"Bazel (software)", retrieved from <<https://en.wikipedia.org/wiki/Bazel_(software)>>, May 8, 2021.

"Cryptographic hash function", retrieved from <<https://en.wikipedia.org/wiki/Cryptographic_hash_function>>, May 3, 2021, 14 pages.

"Code injection", retrieved from <<https://en.wikipedia.org/wiki/Code_injection>>, Apr. 16, 2021, 9 pages.

"Merkle tree", retrieved from <<https://en.wikipedia.org/wiki/Merkle_tree >>, May 6, 2021, 5 pages.

* cited by examiner

Fig. 3

SOME PROVENANCE MANIFEST 218 ASPECTS

| MANIFEST CHECKSUM 302 | PROGRAM PART 208 INFORMATION 304 |
|---|---|

- SOURCE CODE FILE 306 NAME 308 AND CHECKSUM 310
- LIBRARY FILE 312 NAME 314 AND CHECKSUM 316
- RESOURCE FILE 318 NAME 320 AND CHECKSUM 322
- COMPILER 324 NAME 326 AND VERSION 328, PARAMETER 330
- BUILD TOOL 332 NAME 334 AND VERSION 336, PARAMETER 338

| KERNEL CONTEXT 340 INFORMATION 342 | TAMPER DETECTOR 344 |
|---|---|
| RUNTIME 346 NAME 348 AND VERSION 350 | MANIFEST SIGNATURE 352 |
| OPERATING SYSTEM 354 NAME 356 AND VERSION 358 | PDB FILE 368 |
| ENVIRONMENT VARIABLE 366 | REWRITE 230 PROVENANCE MANIFEST 362, 218 |
|  | PART STORAGE INFORMATION 364 |

Fig. 4

SOME BINARY 206, 220, 226 ASPECTS

| INTERMEDIATE / ASSEMBLY LANGUAGE 402 / 404 | TIMESTAMPS 406 |
|---|---|
| EXECUTABLE CODE 408 | ROUTINE 410 | METADATA 412 |
| SYMBOL INFORMATION 210 | CERTIFICATION SIGNATURE 414 |
| FILE 416 PERMISSIONS 418 | PARTS 208, 222 |

SOFTWARE PROVENANCE VALIDATION

BACKGROUND

Attacks on computing systems take many different forms, including some forms which are difficult to predict, and forms which may vary from one situation to another. Accordingly, one of the guiding principles of cybersecurity is "defense in depth". In practice, defense in depth is often pursed by forcing attackers to encounter multiple different kinds of security mechanisms at multiple different locations around or within a computing system. No single security mechanism is able to detect every kind of cyberattack, or able to end every detected cyberattack. But sometimes combining and layering a sufficient number and variety of defenses will deter an attacker, or at least limit the scope of harm from an attack.

To implement defense in depth, cybersecurity professionals consider the different kinds of attacks that could be made. They select defenses based on criteria such as: which attacks are most likely to occur, which attacks are most likely to succeed, which attacks are most harmful if successful, which defenses are in place, which defenses could be put in place, and the costs and procedural changes and training involved in putting a particular defense in place. However, improvements in cybersecurity remain possible, and worth pursuing.

SUMMARY

Some embodiments help secure supply chains that include software, by providing ways to check whether a candidate binary matches source code and other aspects of a build. If a sufficient match is found, the candidate binary can be relied upon to function according to the source code and related build aspects, allowing use of source code review and analysis tools and techniques to check for security flaws, injected malware, and other undesirable items. If a sufficient match is not found by the embodiments, details of a lack of validation or a binary mismatch may be reported. The binary may still correspond to the source code even when a sufficient match is not found, but in no event does the embodiment report a match when the source code actually does not correspond to the binary.

Some embodiments described herein use or provide a hardware and software combination which is configured, e.g., by tailored software, to perform software provenance validation steps. These steps include acquiring a provenance manifest and getting a candidate binary, obtaining at least one candidate item, and attempting to build a validation binary based on the provenance manifest and at least one candidate item. When the attempting yields a success in building the validation binary, these embodiments compare the validation binary to the candidate binary, and produce a provenance attestation according to a result of comparing the binaries. When the attempting yields a failure to build the validation binary, these embodiments produce the provenance attestation according the failure. Related methods and configured storage devices are also described herein.

Other technical activities and characteristics pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims as properly understood, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

FIG. 3 is a block diagram illustrating aspects of some provenance manifests;

FIG. 4 is a block diagram illustrating aspects of some binaries;

DETAILED DESCRIPTION

Overview

Figure 1:
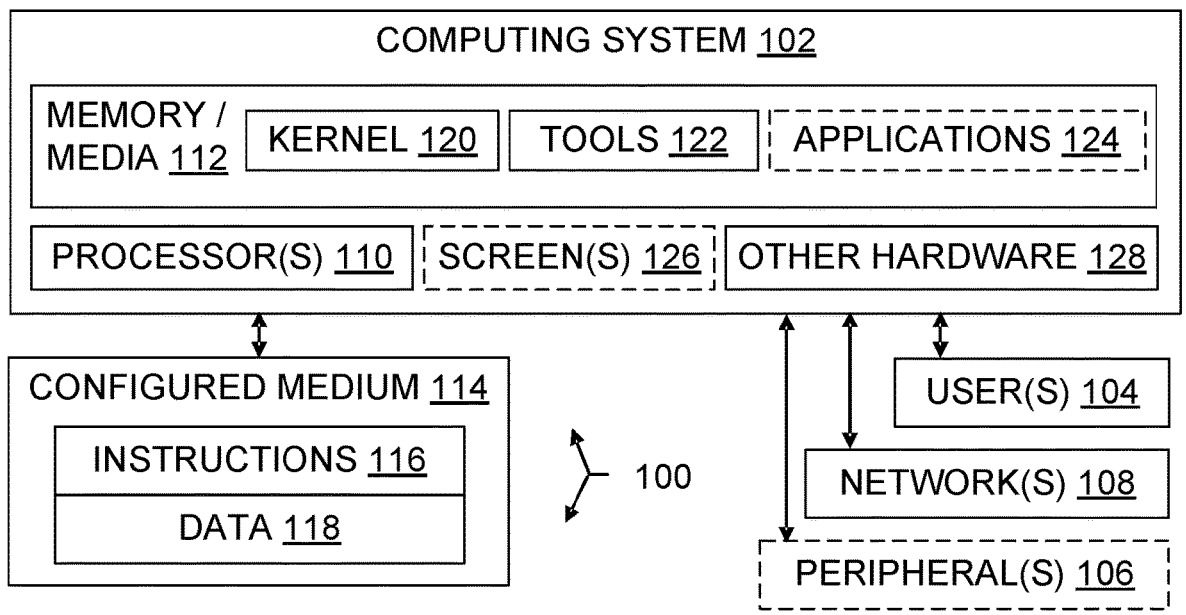
FIG. 1 is a block diagram illustrating computer systems generally and also illustrating configured storage media generally.

Innovations may expand beyond their origins, but understanding an innovation's origins can help one more fully appreciate the innovation. In the present case, some teachings described herein were motivated by insights gained as innovators worked to improve the security of software supply chains, in view of increased attacks (particularly by state-supported threat actors) and in view of ongoing use of open source software.

The innovators observed that the Microsoft .NET™ ecosystem uses binaries as a primary exchange mechanism (mark of Microsoft Corporation). This use of binaries solves various technical problems by shielding the consumer from having to replicate the build environment. It also helps enable a multi-language ecosystem. All in all, binaries have worked well for .NET developers, especially because the underlying format is rich and self-describing.

In many cases, .NET environments use Authenticode® signing for binaries and packages (mark of Microsoft Corporation). The .NET Foundation has made it easier for member projects to get a code signing certificate and actively encourages its projects to do so. In addition, the official NuGet Gallery signs packages to indicate they came from nuget dot org.

However, one remaining technical challenge was how to better secure the linkage between source code (especially, but not only, open source) and binaries. While a significant portion of packages on nuget dot org are open source and often link to a commit in a GitHub® repo, there has been no consistent and practical way to ensure that the source code at that commit actually matches the binaries submitted to nuget dot org (mark of GitHub, Inc.). In other words, a developer's trust in the source code doesn't necessarily justify trust in binaries that purportedly came from that source code. Also, while nuget dot org scans packages for virus and malware, there is presently no feasible way to detect all possible malware. For all the developer knows, someone or something could have injected a bitcoin miner or other malware into the binary, which would not be apparent from the source code in the repository.

Also, if a package consumer finds a zero-day exploit, they usually have no way to patch the binaries themselves. They must find the corresponding repo, get the necessary dependencies for building it, somehow find the correct version of the code, patch it, and then rebuild. This is not an easy task even under ideal circumstances, and is much less viable when time is of the essence, as it often is in real-world environments.

To address these technical problems, the innovators designed a set of validation tooling. For each managed binary file (in a NuGet package, for example), the validation tooling is designed to enumerate all of the input sources used to create it, to validate that these sources are accessible, and to validate that the managed binary matches a validation binary produced using those source files. In doing so, the validation tooling and process need not trust the original build environment, because the validation independently creates a copy (one hopes) of the managed file from the input sources.

The foregoing examples and scenarios are not comprehensive. Other scenarios, technical challenges, and innovations will be apparent to one of skill upon reading the full disclosure herein.

Operating Environments

With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud. An individual machine is a computer system, and a network or other group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A screen 126 may be a removable peripheral 106 or may be an integral part of the system 102. A user interface may support interaction between an embodiment and one or more human users. A user interface may include a command line interface, a graphical user interface (GUI), natural user interface (NUI), voice command interface, and/or other user interface (UI) presentations, which may be presented as distinct options or may be integrated.

System administrators, network administrators, cloud administrators, security analysts and other security personnel, operations personnel, developers, testers, engineers, auditors, and end-users are each a particular type of user 104. Automated agents, scripts, playback software, devices, and the like acting on behalf of one or more people may also be users 104, e.g., to facilitate testing a system 102. Storage devices and/or networking devices may be considered peripheral equipment in some embodiments and part of a system 102 in other embodiments, depending on their detachability from the processor 110. Other computer systems not shown in FIG. 1 may interact in technological ways with the computer system 102 or with another system embodiment using one or more connections to a network 108 via network interface equipment, for example.

Each computer system 102 includes at least one processor 110. The computer system 102, like other suitable systems, also includes one or more computer-readable storage media 112, also referred to as computer-readable storage devices 112. Storage media 112 may be of different physical types. The storage media 112 may be volatile memory, nonvolatile memory, fixed in place media, removable media, magnetic media, optical media, solid-state media, and/or of other types of physical durable storage media (as opposed to merely a propagated signal or mere energy). In particular, a configured storage medium 114 such as a portable (i.e., external) hard drive, CD, DVD, memory stick, or other removable nonvolatile memory medium may become functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se or mere energy under any claim pending or granted in the United States.

The storage device 114 is configured with binary instructions 116 that are executable by a processor 110; "executable" is used in a broad sense herein to include machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other technical operations.

Although an embodiment may be described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processors 110 (e.g., CPUs, ALUs, FPUs, TPUs and/or GPUs), memory/storage media 112, and displays 126, an operating environment may also include other hardware 128, such as batteries, buses, power supplies, wired and wireless network interface cards, for instance. The nouns "screen" and "display" are used interchangeably herein. A display 126 may include one or more touch screens, screens responsive to input from a pen or tablet, or screens which operate solely for output. In some embodiments, peripherals 106 such as human user I/O devices (screen, keyboard, mouse, tablet, microphone, speaker, motion sensor, etc.) will be present in operable communication with one or more processors 110 and memory.

In some embodiments, the system includes multiple computers connected by a wired and/or wireless network 108. Networking interface equipment 128 can provide access to networks 108, using network components such as a packet-switched network interface card, a wireless transceiver, or a telephone network interface, for example, which may be present in a given computer system. Virtualizations of networking interface equipment and other network components such as switches or routers or firewalls may also be present, e.g., in a software-defined network or a sandboxed or other secure cloud computing environment. In some embodiments, one or more computers are partially or fully "air gapped" by reason of being disconnected or only intermittently connected to another networked device or remote cloud. In particular, functionality for software provenance validation enhancements taught herein could be installed on an air gapped network such as a highly secure cloud, and then be updated periodically or on occasion using removable media. A given embodiment may also communicate technical data and/or technical instructions through direct memory access, removable nonvolatile storage media, or other information storage-retrieval and/or transmission approaches.

One of skill will appreciate that the foregoing aspects and other aspects presented herein under "Operating Environments" may form part of a given embodiment. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but may interoperate with items in the operating environment or some embodiments as discussed herein. It does not follow that items which are not in outline or parenthetical form are necessarily required, in any Figure or any embodiment. In particular, FIG. 1 is provided for convenience; inclusion of an item in FIG. 1 does not imply that the item, or the described use of the item, was known prior to the current innovations.

More About Systems

Figure 2:
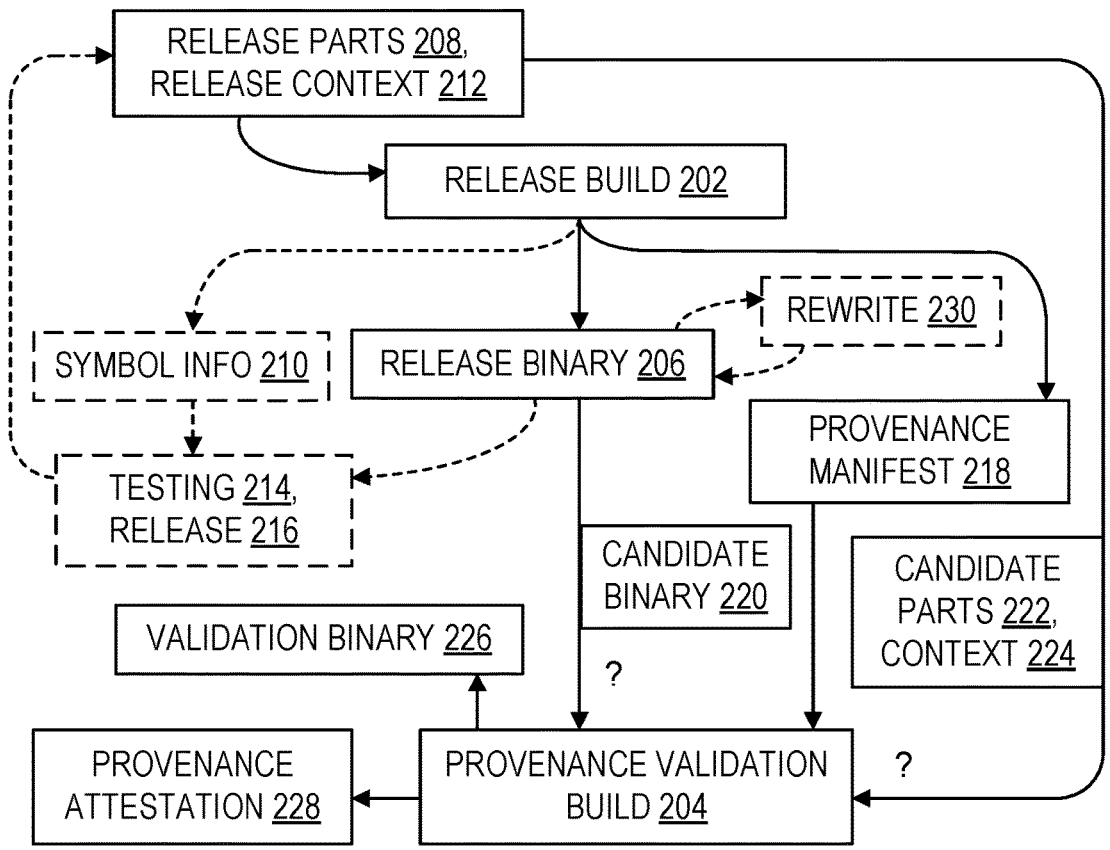
FIG. 2 is a flow diagram illustrating some aspects of provenance validation.

FIG. 2 illustrates a software provenance validation flow 200. A basic goal of provenance validation is to determine whether a given binary was built from particular source code. Since a false positive ("yes, this binary corresponds to that source") could lead to security breaches, any uncertainty should produce a "not validated" result, or at least a warning with caveats about the validation result or an explanation of any assumptions underlying the validation result. Also note that a result could well be "not validated" even when the binary and the source actually do correspond to each other.

To try and determine whether the source and the binary correspond, some provenance validation embodiments try to reproduce the binary from the source. Accordingly, there are at least two build operations involved. In FIG. 2, these are called a "release build" 202 and a "provenance validation build" 204. For convenience, a provenance validation build may also be referred to more concisely as a "validation build" 204. Dashed lines in FIG. 2 indicate optional items and flows for this particular example.

The release build operation 202 produces a release binary 206 from source code 306 and other parts 208 such as libraries 312. The release binary may be an executable or a library, for example. The release build operation 202 may also produce symbol information 210, such as function names and variable names, which is useful for debugging and for static analysis of the binary 206.

The release build operation occurs in a context 212 that includes a compiler 324 and possibly other tools 352, 122 such as linters. The release build context 212 also includes other software, such as a runtime 346 and an operating system 354. The release build context may also include environment variables 366.

In a typical software development scenario, developers create or modify source code 306, and then build 202 a release binary 206 from it. The release binary may then be tested 214, or it may be released 216 for internal or external use, or both. Testing may involve debugging or analysis using the symbol information 210. Changes may be made to the source code 306 or other parts 208, or to the context 212, or both, followed by another release build 202 operation. In some cases, changes are made directly to the release binary 206, e.g., in a rewrite operation 230, e.g., IL weaving. Rewriting 230 a binary is also sometimes called "patching" the binary.

In some embodiments, the release build 202 operation is enhanced to also produce a provenance manifest 218 which contains information about the parts and the context that were used during the release build operation. For instance, the provenance manifest includes part information 304 such as source code file names 308 and content checksums 310, library file names 314 and content checksums 316, and the names 320 and content checksums 322 of resources 318 such as image files that were embedded into the release binary during the release build operation. Similarly, the provenance manifest 218 includes context information 212 such as compiler parameters 330, compiler version 328, names 334 and versions 336 of any other tools 332 used, the runtime name 348 and version 350, and the operating system name 356 and version 358.

In some embodiments, the provenance manifest 218 is embedded in the same file as the symbol information, e.g., in a PDB file 368. That file may then be secured 604 by a cryptographic checksum or digital signature. In other embodiments, the provenance manifest and the symbol information are stored separately from one another, and either or both are secured separately.

In some embodiments, inputs to the provenance validation build 204 include at least the provenance manifest 218, a candidate binary 220, one or more candidate parts 222 such as source code, and a candidate context 224. In one approach, one or more of the candidate items 222 is identified 618 in the provenance manifest by name, location, and content checksum, and is fetched 620 as part of the provenance validation build.

Depending on the circumstances, the candidate binary 220 that is input to the provenance validation build 204 may match the release binary 206, or match a validation binary 226 that is produced by the validation build, or match neither, or match both. The candidate parts 222 input to the provenance validation build 204 may match the parts 208 used by the release build 202, or not match some or all of them 208. Likewise, the candidate context 224 input to the provenance validation build may match the context 212 used by the release build, or not some or all of it 212. Accordingly, FIG. 2 shows question marks on the arrows indicating binary 220, parts 222, and context 224 used as inputs to the provenance validation build 204. In this example, the validation build 204 produces a provenance attestation 228 which attests to the outcome of the validation flow 200.

The attestation 228 may attest that the candidate binary 220 matches the part 222 and the context 224, or may attest to only a partial match, or may attest to no matching aspects. Depending on what matches, the attestation 228 may give details, e.g., to describe why no match was found, why no compilation was attempted as part of the validation build, which parts of the binaries match or which parts do not match, and so on. Examples of attestation 228 content are provided throughout the present disclosure, and will be recognized as such by virtue of being a result or product of validation 200, regardless of whether they are expressly described as attestation content per se.

FIG. 3 shows some aspects of some provenance manifests 218. This is not meant to be a comprehensive list. These items and other items relevant to provenance validation are discussed at various points herein, and additional details regarding them are provided in the discussion of a List of Reference Numerals later in this disclosure document.

FIG. 4 shows some aspects of some binaries, which may be seen in one or more of the binaries 206, 220, or 226, depending on the circumstances. This is not meant to be a comprehensive list. These items and other items relevant to binaries are discussed at various points herein, and additional details regarding them are provided in the discussion of a List of Reference Numerals later in this disclosure document.

Some embodiments use or provide a functionality-enhanced system, such as system 200 or another system 102 that is enhanced for software provenance validation as taught herein. In some embodiments, an enhanced system includes a digital memory 112 and a processor 110 in operable communication with the memory. The enhanced computing system is configured to perform software provenance validation steps including automatically acquiring 502 a provenance manifest 218 and getting 504 a candidate binary 220, obtaining 506 at least one candidate item 222, and attempting 508 to build a validation binary 226 based on the provenance manifest and the at least one candidate item. The attempt 508 either succeeds or it fails. When the attempt yields a success in building the validation binary, the system compares 602 the validation binary to the candidate binary, and produces 512 a provenance attestation 228 according to a result of comparing the binaries. When the attempt yields a failure to build the validation binary, the system produces 512 the provenance attestation according the failure.

In some embodiments, the provenance manifest 218 includes at least one of the following kinds of program part information 304: a source code file name 308 and content checksum 310, a library file name 314 and content checksum 316, or a resource file name 320 and content checksum 322.

In some embodiments, the provenance manifest 218 includes at least one of the following kinds of build tool context information: a compiler name 326 and version 328, a compiler parameter 330, a build tool name 334 and version 336, or a build tool parameter 338.

In some embodiments, the provenance manifest 218 includes at least one of the following kinds of kernel context information: a runtime name 348 and version 350, or an operating system name 356 and version 358.

In some embodiments, the provenance manifest includes at least one of the following: a copy of a second provenance manifest 218, or a reference to the second provenance manifest 218. In some, the provenance manifest and the second provenance manifest differ from each other with respect to at least one of the following: program part information 304, build tool 332 context information, or kernel context information 342.

In some embodiments, a provenance manifest references other provenance manifests in a tree of provenance manifests. This allows provenance validation without rebuilding everything from scratch, to the extent that the referenced provenance manifests are trusted. In some, provenance validation is an independent process for each binary. Some embodiments verify that every dependency of a particular DLL or another binary also passes provenance validation. In some embodiments, provenance validation is an independent process for each binary.

In some embodiments, validating provenance for a binary merely verifies an assertion that a certain set of inputs was used to produce a binary. Once the relationship between inputs and a binary is established, the binary is as trusted (or not trusted) as the inputs. It is expected that the user of the technology will perform whatever process they see fit to decide whether the inputs from the manifest are trusted. This may include, e.g., requiring the inputs to be loaded from a specific trusted source, or making the inputs that were used during the validation available to the publisher of the binary and then asking the publisher to attest that the inputs are legitimate.

In some embodiments, validating provenance for a binary merely verifies a claim that a certain set of inputs was used to build the binary. Once that is established, the binary is as trusted as the inputs, and it is presumed that the user of the technology will perform whatever process they see fit to decide that the inputs from the manifest are trusted. This may include, e.g., requiring the inputs to be loaded from a specific trusted source, or making the inputs that were used during the validation available to the publisher of the binary and then asking the publisher to attest that the inputs are legitimate.

In some embodiments, the provenance manifest includes a rewrite provenance manifest 362 that describes a binary rewrite operation 230. Third parties (e.g., rewrite tool vendors, parties other than a compiler vendor or operating system vendor), may supply a rewrite provenance manifest that describes a rewrite operation and is digitally signed by the third party. In some embodiments, the rewrite provenance manifest is individually secured by at least one of the following: a checksum 302, a digital signature 352, or a tamper detection mechanism 344.

In some embodiments, the provenance manifest resides in a file 416 which is secured 604 by at least one of the following: a checksum 302, a digital signature 352, or a tamper detection mechanism 344.

In some embodiments, the provenance manifest resides in a debugging file 368 which also contains symbol information 210.

Other system embodiments are also described herein, either directly or derivable as system versions of described processes or configured media, duly informed by the extensive discussion herein of computing hardware.

Although specific provenance validation examples are shown in the Figures, an embodiment may depart from those examples. For instance, items shown in different Figures may be included together in an embodiment, items shown in a Figure may be omitted, functionality shown in different items may be combined into fewer items or into a single item, items may be renamed, or items may be connected differently to one another.

Examples are provided in this disclosure to help illustrate aspects of the technology, but the examples given within this document do not describe all of the possible embodiments. A given embodiment may include additional or different security controls, technical features, mechanisms, access controls, operational sequences, data structures, or other functionalities for instance, and may otherwise depart from the examples provided herein.

Processes (a.k.a. Methods)

Figure 5:
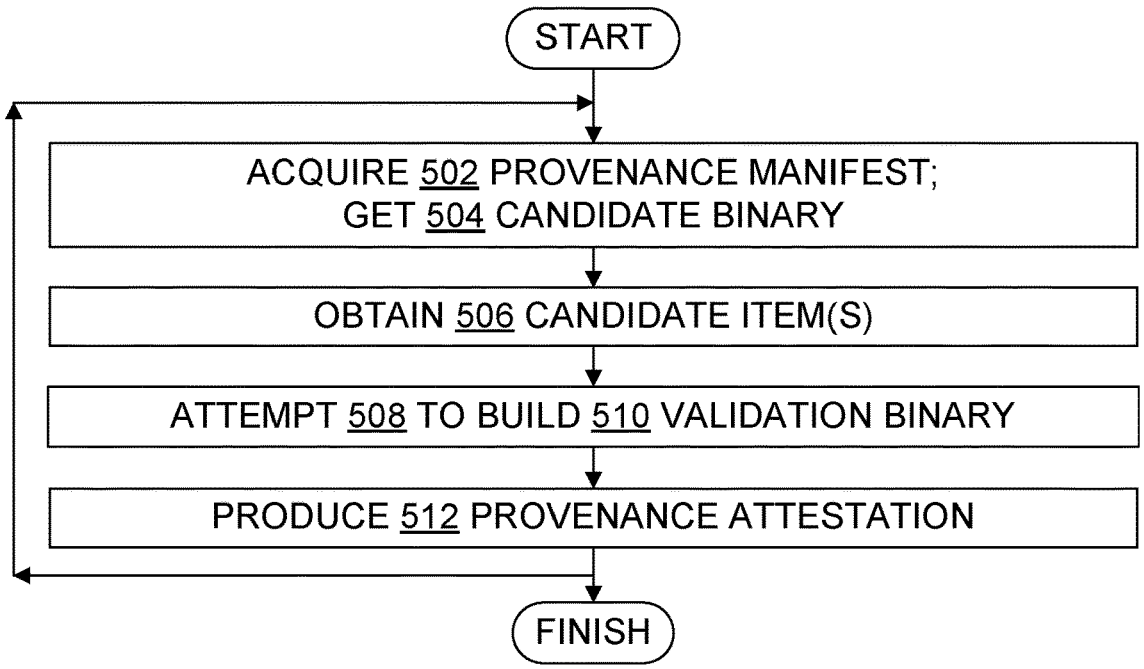
FIG. 5 is a flowchart illustrating steps in some provenance validation methods.
Figure 6:
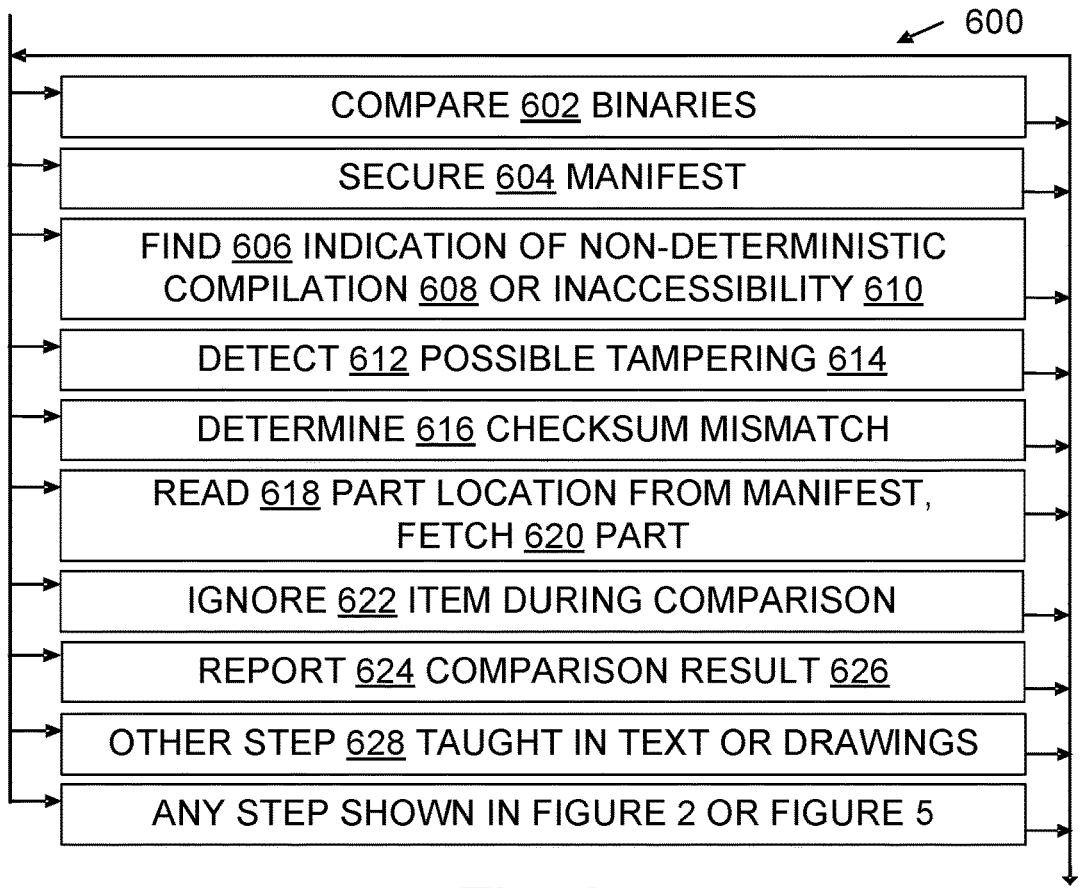
FIG. 6 is a flowchart further illustrating steps in some provenance validation methods.

FIGS. 5 and 6 illustrate method families 500, 600 that may be performed or assisted by an enhanced system, such as a system 102 enhanced with provenance validation functionality taught herein. Such methods may also be referred to as "processes" in the legal sense of that word.

Technical methods shown in the Figures or otherwise disclosed will be performed automatically, e.g., by an enhanced security infrastructure, unless otherwise indicated. Some related methods may also be performed in part automatically and in part manually to the extent action by a human person is implicated, e.g., a human user may select a candidate binary 220, but no method contemplated as innovative herein is entirely manual.

In a given embodiment zero or more illustrated steps of a method may be repeated, perhaps with different parameters or data to operate on. Steps in an embodiment may also be done in a different order than the top-to-bottom order that is laid out in FIGS. 5 and 6. Steps may be performed serially, in a partially overlapping manner, or fully in parallel. In particular, the order in which action items of FIGS. 5 and 6 are traversed to indicate the steps performed during a process may vary from one performance of the method to another performance of the method. Steps may also be omitted, combined, renamed, regrouped, be performed on one or more machines, or otherwise depart from the illustrated flow, provided that the method performed is operable and conforms to at least one claim.

Some embodiments use or provide a method for software provenance validation, the method including the following steps: acquiring 502 a digital provenance manifest; getting 504 a candidate binary; obtaining 506 at least one digital candidate item; attempting 508 to computationally build 510 a validation binary based on the provenance manifest and the at least one candidate item, the attempting yielding either a success or a failure; when the attempting yields a success in building the validation binary, computationally comparing 602 the validation binary to the candidate binary, and producing 512 a digital provenance attestation according to a result of comparing the binaries; and when the attempting yields a failure to build the validation binary, producing 512 the digital provenance attestation according the failure.

In some embodiments and some situations, the attempting yields the failure in response to detecting 612 an indication of tampering 614 with the provenance manifest. Tampering may be detected, e.g., using a digitally signed checksum. In some embodiments, tampering with the manifest results in the validation failing.

In some embodiments and some situations, the attempting yields the failure at least partially in response to finding 606 an indication of at least one of the following: use 608 of a non-deterministic compiler; use 610 of a local storage to store a program part; storage 610 of a program part outside of any publicly accessible location; or storage 610 of a program part outside of any internet-accessible repository. For a closed source project, storage in an intranet or other non-public location could be permitted without invalidating provenance.

In some embodiments and some situations, the attempting yields the failure in response to determining 616 that the digital candidate item 222 has a content checksum 310, 316, or 322 that does not match the provenance manifest. Provenance validation build may report that the binary cannot be validated using these parts because one or more of the parts have a content checksum that does not match the checksum in the provenance manifest.

In some embodiments, obtaining 506 at least one digital candidate item includes reading 618 from the provenance manifest a location of the digital candidate item, and fetching 620 the digital candidate item from the location.

In some embodiments, attempting to computationally build a validation binary avoids 622 reliance on a stated location of the digital candidate item. A provenance validation build may ignore the stated location of each part, and instead compare the checksum of the part that is input to the provenance validation build against a checksum listed for that part in the provenance manifest. For validation in these embodiments, it doesn't matter where the source code came from if it has the expected content checksum.

In some embodiments and some situations, the attempting yields a success, and comparing 602 the validation binary to the candidate binary avoids 622 reliance on comparison of any certification signature 414 of either binary. That is, the two binaries may have certification signatures than one another, but still be considered to match for the purpose of validation.

In some embodiments and some situations, the attempting yields a success, and comparing 602 the validation binary to the candidate binary ignores 622 timestamps 406 and ignores 622 file access permissions 418. That is, the two binaries may have different timestamps than one another, or have different file access permissions than one another, but still be considered to match for the purpose of validation.

In some embodiments and some situations, the attempting ignores 622 a difference in two compiler versions 328 in response to ascertaining that both compiler versions are known to generate equivalent code 402, 404, or 408 for at least a portion of the candidate binary and the validation binary. Sometimes a compiler version change is not correlated with a change in the compiler's code generation; the change may be instead a refactoring, or a change in the format of compiler-internal data structures that does not impact generated code, for example. Provenance validation build may ignore differences in compiler version when the two versions are known to produce equivalent code for the relevant portions of the candidate and validation binaries. For example, maybe jump table format was changed but the two compiler versions otherwise produce the same code.

In some embodiments, the provenance validation can do similar relaxations for other build tool versions, operating system versions, runtime versions, or a combination thereof. For each of these items there may be a wide range of versions that would be able to validate provenance. Hence some embodiments do not stop a user from making a validation check using different versions than those actually used in the original release build. In the case provenance validation fails, however, an embodiment may point out version differences to the user and suggest that the user specify particular versions and try validation again.

Configured Storage Media

Some embodiments include a configured computer-readable storage medium 112. Storage medium 112 may include disks (magnetic, optical, or otherwise), RAM, EEPROMS or other ROMs, and/or other configurable memory, including in particular computer-readable storage media (which are not mere propagated signals). The storage medium which is configured may be in particular a removable storage medium 114 such as a CD, DVD, or flash memory, and may also be referred to as a "storage memory" or "storage device". A general-purpose memory, which may be removable or not, and may be volatile or not, can be configured into an embodiment using items such as provenance manifest 218, provenance attestations 228, or software fully or partially implementing flows shown in FIG. 2, 5, or 6, in the form of data 118 and instructions 116, read from a removable storage medium 114 and/or another source such as a network connection, to form a configured storage medium. The configured storage medium 112 is capable of causing a computer system 102 to perform technical process steps for provenance validation in a computing system, as disclosed herein. The Figures thus help illustrate configured storage media embodiments and process (a.k.a. method) embodiments, as well as system and process embodiments. In particular, any of the process steps illustrated in FIG. 2, 5, or 6, or otherwise taught herein, may be used to help configure a storage medium to form a configured storage medium embodiment.

Some embodiments use or provide a computer-readable storage medium 112, 114 configured with data 118 and instructions 116 which upon execution by at least one processor 110 cause a cloud or other computing system to perform a process for provenance validation. This process includes: acquiring a digital provenance manifest; getting a candidate binary; obtaining at least one digital candidate item; attempting to computationally build a validation binary based on the provenance manifest and the at least one candidate item, the attempting yielding either a success or a failure; when the attempting yields a success in building the validation binary, computationally comparing the validation binary to the candidate binary, and producing a digital provenance attestation according to a result of comparing the binaries; and when the attempting yields a failure to build the validation binary, producing the digital provenance attestation according the failure.

In some embodiments and situations, the attempting yields the failure, and the method further includes reporting 624 that the validation binary and the candidate binary differ in at least one of the following: intermediate language 402, assembly language 404, executable code 408, metadata 412, or symbol information 210.

In some embodiments and situations, the attempting yields the failure, and the method further includes reporting 624 that the validation binary and the candidate binary are the same in at least one of the following: intermediate language 402, assembly language 404, executable code 408, metadata 412, or symbol information 210.

In some embodiments and situations, the attempting yields the failure, and the method further includes reporting 624 that the validation binary and the candidate binary differ in a particular candidate part file 416, and reporting a name 308, 314, or 320 of the particular candidate part file.

In some embodiments and situations, the attempting yields the failure, and the method further includes reporting 624 that the validation binary and the candidate binary differ in that one of the binaries contains a routine 410, e.g., a method in the computing sense, that is not present in the other one.

Additional Examples and Observations

One of skill will recognize that not every part of this disclosure, or any particular details therein, are necessarily required to satisfy legal criteria such as enablement, written description, or best mode. Any apparent conflict with any other patent disclosure, even from the owner of the present innovations, has no role in interpreting the claims presented in this patent disclosure. With this understanding, which pertains to all parts of the present disclosure, some additional examples and observations are offered in the following sections.

Some scenarios in which an embodiment provides provenance validation may include: package consumers who wish to confirm provenance for themselves, package authors who wish to verify their package is reproducible, package hosts (e.g., NuGet dot org and *Terrapin*) who wish to validate packages on upload and present the status as part of an overall package health or project health assessment, developers wish to confirm provenance for themselves, or InfoSec (cybersecurity) personnel who want to confirm software provenance for themselves.

In one scenario, an internal package security team wants to reduce the supply chain risk to their apps and services. They want to make sure that the binaries being used can be traced to particular sources, so the team can run security scans on the source code. The packages being validated are produced from a mix of public and internal sources. The team sets up infrastructure to run the validation tool for each package they use. They plan to trace the source and rebuild all packages being used.

In some scenarios, a user calls a provenance validation tool for each managed binary in the NuGet package, to check the status. The tool produces one of the following results: binary not buildable, binary buildable but not verifiable (builds but not the same deterministic output), or binary is deterministically reproducible. If all of the managed binaries are deterministically reproducible, the package is marked as reproducible and provenance validated.

In some scenarios, a developer is updating their library and wants to ensure that it can be successfully provenance validated, so the library's users feel secure in taking a dependency on the library. Also, NuGet dot org will give the library a higher health score based on successful provenance validation. The developer in some scenarios knows that by updating to the latest SDK, they are secure by default because the right settings are automatically enabled for their project. In a .NET™ environment, for example, settings could include: Source Link, EmbedUntrackedSources, PublishRepositoryUrl, use the latest Roslyn compiler which stores compiler flags into the PDB, PDB is automatically included in the NuGet package, and Strong name keys are checked into source control. After building and publishing the package using the latest SDK, NuGet dot org validates the library and assigns it a higher score because of the validation.

In some scenarios, a developer is searching for a logging library on NuGet dot org. They search and see two interesting libraries, one with a badge indicating it is verified, and the other without such a badge. The developer picks the verified one, and feels confident that the package they are using does not contain code they are not aware of and or lack visibility into. They trust NuGet to have validated that the package meets the specified supply chain requirements.

In some scenarios, a corporate or government developer at a large organization in an internal team that is building a service needs to make sure they comply with their supply chain requirements. They use a feed containing only validated packages provided by their internal InfoSec team.

In some scenarios, NuGet or another package manager is looking at ways to improve the security of the ecosystem and provide metrics around project health or package health or both. Ensuring that the binaries in the project match the source is an important part, helping ensure no tampering occurs in the build pipeline. The package manager adds a provenance validation process on package ingestion. For each managed binary in the package, a provenance validation tool is called to check the binary's status. The result is a validation success or a validation failure. If provenance of all of the files is successfully validated, the package is marked as reproducible. If a package contains unmanaged binaries, then the result would be indeterminate and marked accordingly. Each managed binary or PDB file in the package is added to a package manager symbol server. NuGet or another package manager may retroactively do for all existing packages it manages.

In some scenarios, a package manager will allow packages that are not reproducible to be ingested; failure is not a hard block. The package manager will display the reproducible status in appropriate metadata and user interface so users and tools that trust the package manager can make informed decisions without revalidating each binary's provenance themselves.

In some scenarios, a .NET™ tools team or another software development tools team will deliver a set of tools to a Terrapin team or another team with build or rebuild responsibility to provide the provenance validation. The different responsibilities involved may include: providing a list of artifacts which support provenance validation, acquiring such artifacts, performing validation and making a determination of provenance.

In some scenarios, a dotnet-build-manifest-generator or similar tool takes in a DLL and PDB file combination and generates an artifacts manifest file 218 which lists the set of artifacts used to perform a validation. This manifest may specify a version of a dotnet-build-validator or similar tool which is used to perform the validation. Tools may be meant to work with binaries produced by earlier versions of a compiler. Every time the contents of the PDB provenance metadata change a new version of this tool may be produced that can account for the metadata.

The dotnet-build-validator or a similar global tool may take in the following arguments: the binary file to validate, its accompanying PDB, and a directory containing the artifacts gathered from the artifacts manifest file. The tool will then report whether the provided PDB file can be provenance validated. The tool may have three output states: validation succeeded, validation failed because the binaries do not match, or validation failed because a binary could not be produced. This tool may be simultaneously shipped with the compiler: every time there is a new compiler, there can be a new version of this tool that uses those compiler binaries. The compiler does not necessarily guarantee deterministic output between versions of the compiler. Even minor version differences of the compiler can produce different IL for the same source code if the code intersects a bug fix or optimization. In order for the validator to function with high fidelity, one should use the validator version that shipped with the compiler. The validator may be installed as a local tool for a given validation event. That will allow for every validation event to use a different version of dotnet-build-validator without having to worry about version conflicts as it would if it were installed as a global tool.

A validation workflow in some scenarios includes the following, for each DLL or other component binary in a NuPkg file or other set of one or more binaries: execute dotnet-build-manifest-generator on the DLL and PDB combination; setup the environment for validation by transferring execution to the appropriate operating system listed in the manifest (future actions are expected to run on this machine), and installing the correct .NET™ or other runtime on the target machine if necessary; download the artifacts listed in the artifact manifest file as well as the specified version of dotnet-build-validator or other validator; and execute validator providing the DLL, PDB and the directory where the artifacts were downloaded. Downloading the artifacts may utilize one or more directories to store source files and references. The name of the artifacts in those directories will be specified in the manifest file.

In view of the present disclosure, it will be acknowledged that simply calling existing build scripts is not sufficient to give the same validation results. For example, source or other part files might have the names and locations specified in a build script, but different content. Likewise, compiler versions, build tool versions, runtime versions, operating system versions, or environment variables are not necessarily specified in build scripts, and therefore might differ in a rebuild. Also, validation as taught herein can provide additional details about what matches and what does not match. Moreover, validation as taught herein helps ensures visibility to all of the source files used to produce a binary. Those source files can then be further audited to ensure they are expected and correct. Other differences between the provenance validation taught herein and other build or rebuilds may also be apparent.

Some additional observations regarding reproducible build validation follow. In some embodiments, a validation tool works on any managed binary, regardless of target framework. In some, the validation tool works on any operating system. In some, the validation tool supports public sources for sources and symbols. In some, the validation tool supports non-public sources for sources and symbols if acceptable credentials are given. In some, the validation tool can be invoked by a user by entering a single command. In some, the validation tool supports a variety of programming languages, including C #, F #, Objective C, Java, JavaScript, Python, PHP, Perl, and many others (marks of their respective owners). In some, the validation tool supports any .NET™ SDK tool which creates or modifies DLLs or EXEs. In some, the validation tool evaluates provenance of embedded resources, such as .resx resources or .baml resources.

Some embodiments support modification or patching during validation, to create a runnable binary that is functionally different from the original, with that rewrite noted in the validation report. Some support exporting a rebuilt artifact. Some support using the tool to validate binaries in an environment different than the environment the binaries were produced on. Some support validation of transitive dependency chain. Some support validation of existing packages, e.g., by adding new metadata added to a pdb 368.

In some embodiments, a user experience is delivered through a .NET CLI (command line interface) tool with an invocation such as "dotnet validate ThePackage.nupkg" or "dotnet validate TheFile.dll". The tool is responsible for obtaining symbols from well-known symbol servers, e.g., NuGet public symbols, Microsoft public symbol server, and through a user-configured symbol path. To validate a NuGet package, a user can download it from NuGet dot org or by using a "dotnet nuget download <packageId>" CLI command. Source files generated as part of the build pipeline may be supported (e.g., Source Generators, Code Behind) when "EmbedUntrackedSources" or "EmbedAllSources" or a similar flag or environment variable or parameter is set true. The generated sources are stored in the PDB file or other symbol file, and are thus available for the validation steps. Source generators and other tooling are not re-executed, rather, the sources are extracted from the PDB and reused as input.

In some embodiments, IL weavers and trimmers are supported. Weavers and trimmers may participate in the validation steps by storing their input settings in the pdb and providing a mechanism to obtain the specific version used, allowing it to be run again. The rewrite tools would also be deterministic with respect to their inputs.

Some embodiments utilize the following artifacts: portable PDBs (embedded may be supported), binary references (referenced assemblies), source code. PDBs or their counterparts contain pointers to the original source, or contain embedded source. They also contain information about the binary references and compiler flags used during the original compilation. As to binary references, in this example any file used as a reference to the compiler is to be available when rebuilding to use as a reference again.

In this example, source may be retrieved either from an online location, as specified in the PDB (and validated against the PDB's checksums), or embedded in the PDB. Source generated as part of the build, e.g., from source generators or generated UI code-behind, is expected to be embedded as it would not be available in the repo.

In this example, the provenance validation tool obtains the artifacts from a symbol server (as it already contains the ability to index any PE (portable executable) file and PDB) and HTTPS/local source location. Microsoft's primary symbol server (MSDL) already contains both PE files and PDBs. NuGet's symbol server may be extended to include PE files and Windows PDBs for all packages. Authenticating to a source location or symbol server may be handled by the tool in an appropriate way, e.g., through Git Credential Manager or the like.

As to User Experience, one suitable path corresponds to the following (variations are possible): dotnet validate TheFile.dll-verbose; Obtaining symbols for TheFile.dll; . . . trying msdl.microsoft.com: Not Found; . . . trying symbols.nuget.org: Found; File contains source link information; Generating manifest to c:\temp\config . . . ; Downloading source files to c:\temp\sources . . . , Downloading reference files c:\temp\references; . . . trying to get System.dll from msdl.microsoft.com: Found; . . . trying to get AutoMapper.dll from msdl.microsoft.com: Not Found; . . . trying to get AutoMapper.dll from symbols.nuget.org: Found; All artifacts downloaded, validating . . . ; File validated successfully.

In this example, error conditions are reported along with relevant troubleshooting data: dotnet validate ThePackage.nupkg, ERROR: TheFile.dll was not built with deterministic settings or ERROR: SomeSource.cs could not be found or ERROR: this DLL was built on a different operating system or ERROR: this DLL was built using a .NET Runtime which is not available on this machine, for example.

As to Functions, in this example, validation for a given .NET library (DLL) or executable presumes the Function: has all sources identifiable, has all sources accessible (for provenance build), does not include code or functionality beyond those identified (excluding resources in some embodiments), and provides a simple pass or fail output value. Some scenarios include security supply chain validation, e.g., to validate IL matches. Some ignore signatures or signing (strong naming, certs) for validation (provenance may be validated despite different signatures). Some recreate embedded resources, extracts and reuse them as-is. Some do not support multiple line endings, others do. Some allow rebuild validation across supported versions of Windows® or Linux® operating systems (marks of their respective owners). Some support a SOURCE DATE EPOCH standard. Some allow the identification and acquisition of correct compiler and runtime version. Some support automatic acquisition while versions are covered by a compiler vendor support policy. Some support validation with customer-provided compiler or runtime or both, including validation of provided artifacts via signing or hash, for validation outside a support policy.

In some embodiments, when validation fails, users receive details. Reported details may include, e.g., what minimum toolchain requirements have not been met to enable validation, what compilation requirements have not been met to enable validation, what required artifacts (e.g., compiler) could not be acquired automatically, what sources or code or other bits were unable to be acquired or validated or both, missing platform or OS requirements. In some embodiments, users can optionally receive a report containing one or more of: identified sources and, when possible, their location (URI), commit, and hash; identified embedded resources and their location within the supplied artifact and hash; identified symbols and their location (URI); identified compiler switches; identified tools (compiler, runtime, other) and their location (URI); identified OS, and any validation failure messages, for example.

In some embodiments, provenance validation will never give a false positive. That is, for artifacts that didn't produce a binary, an attestation 228 will never claim a provenance match. But there are cases in which given artifacts did produce the binary that an attestation 228 will report a provenance failure. That may occur when one of the other inputs to the build, compiler version, operating system version, runtime version, or another item, was different than the original build. In those cases, the provenance tooling may produce a message saying that provenance validation failed, and also reporting that a different compiler or runtime or operating system was used than in the original build 202.

It is possible that customers do not need an exact match on compiler, runtime, and operating system to validate provenance. For each of these items there may be a wide range of versions that would be able to validate provenance. Hence the tooling in some embodiments does not prevent validation attempts that using different items than the original context. In the case provenance fails, such an embodiment may point out that the user could address these differences and try validation again.

Additional support for the discussion above is provided below. For convenience, this additional support material appears under various headings. Nonetheless, it is all intended to be understood as an integrated and integral part of the present disclosure's discussion of the contemplated embodiments.

Technical Character

The technical character of embodiments described herein will be apparent to one of ordinary skill in the art, and will also be apparent in several ways to a wide range of attentive readers. Some embodiments address technical activities such as building 510 binaries, comparing 602 binaries, securing 604 manifests 218, and determining 616 checksum 310, 316, or 322 mismatches, which are each an activity deeply rooted in computing technology. Some of the technical mechanisms discussed include, e.g., provenance manifests 218, checksums 302, 310, 316, or 322, digital signatures 352, environment variables 366, compilers 324, build tools 332, runtimes 346, and operating systems 354. Some of the technical effects discussed include, e.g., provenance validation assessments (failure or success), and reporting of various details about why a validation 600 or 200 failed. Thus, purely mental processes and activities limited to pen-and-paper are clearly excluded. Other advantages based on the technical characteristics of the teachings will also be apparent to one of skill from the description provided.

Some embodiments described herein may be viewed by some people in a broader context. For instance, concepts such as data integrity, efficiency, privacy, speed, or trust may be deemed relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems, such as how to automatically and effectively improve software supply chain security. Other configured storage media, systems, and processes involving data integrity, efficiency, privacy, speed, or trust are outside the present scope. Accordingly, vagueness, mere abstractness, lack of technical character, and accompanying proof problems are also avoided under a proper understanding of the present disclosure.

Additional Combinations and Variations

Any of these combinations of code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants described above.

More generally, one of skill will recognize that not every part of this disclosure, or any particular details therein, are necessarily required to satisfy legal criteria such as enablement, written description, or best mode. Also, embodiments are not limited to the particular motivating examples and scenarios, flows, operating environments, time period examples, software processes, security tools, identifiers, data structures, data selections, naming conventions, notations, or other implementation choices described herein. Any apparent conflict with any other patent disclosure, even from the owner of the present innovations, has no role in interpreting the claims presented in this patent disclosure.

Acronyms, Abbreviations, Names, and Symbols

Some acronyms, abbreviations, names, and symbols are defined below. Others are defined elsewhere herein, or do not require definition here in order to be understood by one of skill.

ALU: arithmetic and logic unit
API: application program interface
BIOS: basic input/output system
CD: compact disc
CPU: central processing unit
DVD: digital versatile disk or digital video disc
FPGA: field-programmable gate array
FPU: floating point processing unit
GPU: graphical processing unit
GUI: graphical user interface
HTTP(S): hypertext transfer protocol (secure)
IaaS or IAAS: infrastructure-as-a-service
ID: identification or identity
IoT: Internet of Things
IP: internet protocol
LAN: local area network
OS: operating system
PaaS or PAAS: platform-as-a-service
RAM: random access memory
ROM: read only memory
TCP: transmission control protocol
TLS: transport layer security
TPU: tensor processing unit
UDP: user datagram protocol
UEFI: Unified Extensible Firmware Interface
URI: uniform resource identifier
URL: uniform resource locator
WAN: wide area network Some Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise the right to specific and chosen lexicography. Quoted terms are being defined explicitly, but a term may also be defined implicitly without using quotation marks. Terms may be defined, either explicitly or implicitly, here in the Detailed Description and/or elsewhere in the application file.

A "computer system" (a.k.a. "computing system") may include, for example, one or more servers, motherboards, processing nodes, laptops, tablets, personal computers (portable or not), personal digital assistants, smartphones, smartwatches, smartbands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

An "administrator" (or "admin") is any user that has legitimate access (directly or indirectly) to multiple accounts of other users by using their own account's credentials. Some examples of administrators include network administrators, system administrators, domain administrators, privileged users, service provider personnel, and security infrastructure administrators.

A "multithreaded" computer system is a computer system which supports multiple execution threads. The term "thread" should be understood to include code capable of or subject to scheduling, and possibly to synchronization. A thread may also be known outside this disclosure by another name, such as "task," "process," or "coroutine," for example. However, a distinction is made herein between threads and processes, in that a thread defines an execution path inside a process. Also, threads of a process share a given address space, whereas different processes have different respective address spaces. The threads of a process may run in parallel, in sequence, or in a combination of parallel execution and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, machine learning, and so on.

"Kernels" include operating systems, hypervisors, virtual machines, BIOS or UEFI code, and similar hardware interface software.

"Code" means processor instructions, data (which includes constants, variables, and data structures), or both instructions and data. "Code" and "software" are used interchangeably herein. Executable code, interpreted code, and firmware are some examples of code.

"Program" is used broadly herein, to include applications, kernels, drivers, interrupt handlers, firmware, state machines, libraries, and other code written by programmers (who are also referred to as developers) and/or automatically generated.

A "routine" is a callable piece of code which normally returns control to an instruction just after the point in a program execution at which the routine was called. Depending on the terminology used, a distinction is sometimes made elsewhere between a "function" and a "procedure": a function normally returns a value, while a procedure does not. As used herein, "routine" includes both functions and procedures. A routine may have code that returns a value (e.g., sin(x)) or it may simply return without also providing a value (e.g., void functions).

"Service" means a consumable program offering, in a cloud computing environment or other network or computing system environment, which provides resources to multiple programs or provides resource access to multiple programs, or does both.

"Cloud" means pooled resources for computing, storage, and networking which are elastically available for measured on-demand service. A cloud may be private, public, community, or a hybrid, and cloud services may be offered in the form of infrastructure as a service (IaaS), platform as a service (PaaS), software as a service (SaaS), or another service. Unless stated otherwise, any discussion of reading from a file or writing to a file includes reading/writing a local file or reading/writing over a network, which may be a cloud network or other network, or doing both (local and networked read/write).

"IoT" or "Internet of Things" means any networked collection of addressable embedded computing or data generation or actuator nodes. Such nodes may be examples of computer systems as defined herein, and may include or be referred to as a "smart" device, "endpoint", "chip", "label", or "tag", for example, and IoT may be referred to as a "cyber-physical system". IoT nodes and systems typically have at least two of the following characteristics: (a) no local human-readable display; (b) no local keyboard; (c) a primary source of input is sensors that track sources of non-linguistic data to be uploaded from the IoT device; (d) no local rotational disk storage—RAM chips or ROM chips provide the only local memory; (e) no CD or DVD drive; (f) embedment in a household appliance or household fixture; (g) embedment in an implanted or wearable medical device; (h) embedment in a vehicle; (i) embedment in a process automation control system; or (j) a design focused on one of the following: environmental monitoring, civic infrastructure monitoring, agriculture, industrial equipment monitoring, energy usage monitoring, human or animal health or fitness monitoring, physical security, physical transportation system monitoring, object tracking, inventory control, supply chain control, fleet management, or manufacturing. IoT communications may use protocols such as TCP/IP, Constrained Application Protocol (CoAP), Message Queuing Telemetry Transport (MQTT), Advanced Message Queuing Protocol (AMQP), HTTP, HTTPS, Transport Layer Security (TLS), UDP, or Simple Object Access Protocol (SOAP), for example, for wired or wireless (cellular or otherwise) communication. IoT storage or actuators or data output or control may be a target of unauthorized access, either via a cloud, via another network, or via direct local access attempts.

"Access" to a computational resource includes use of a permission or other capability to read, modify, write, execute, move, delete, create, or otherwise utilize the resource. Attempted access may be explicitly distinguished from actual access, but "access" without the "attempted" qualifier includes both attempted access and access actually performed or provided.

"Secured" means only that some security is provided, not that the effectiveness of the security is guaranteed.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

A cybersecurity operation is "ineffective" when it is not performed at all, or when it returns an error code, or when it does not do at least one of the following: grant a requested access, grant a requested change in registered authentication methods or credentials, grant a requested change in privilege, or change (add, delete, modify) a user identity.

"Process" is sometimes used herein as a term of the computing science arts, and in that technical sense encompasses computational resource users, which may also include or be referred to as coroutines, threads, tasks, interrupt handlers, application processes, kernel processes, procedures, or object methods, for example. As a practical matter, a "process" is the computational entity identified by system utilities such as Windows® Task Manager, Linux® ps, or similar utilities in other operating system environments (marks of Microsoft Corporation, Linus Torvalds, respectively). "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). "Process" and "method" in the patent law sense are used interchangeably herein. Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided. Steps performed automatically are presumed to include at least one operation performed proactively.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment, particularly in real-world embodiment implementations. Provenance validation operations such as acquiring 502 a manifest 218, getting 504 a candidate binary 220, obtaining 506 candidate items 222 or 224, and building 510 a binary, are understood to be inherently digital. A human mind cannot interface directly with a CPU or other processor, or with RAM or other digital storage, to read and write the necessary data to perform the provenance validation steps taught herein. This would all be well understood by persons of skill in the art in view of the present disclosure.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

Throughout this document, use of the optional plural "(s)", "(es)", or "(ies)" means that one or more of the indicated features is present. For example, "processor(s)" means "one or more processors" or equivalently "at least one processor".

For the purposes of United States law and practice, use of the word "step" herein, in the claims or elsewhere, is not intended to invoke means-plus-function, step-plus-function, or 35 United State Code Section 112 Sixth Paragraph/Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, or disclosed as having a functional relationship with the structure or operation of a zac widget, would be deemed part of the structures identified in the application for zac widgets and would help define the set of equivalents for zac widget structures.

One of skill will recognize that this innovation disclosure discusses various data values and data structures, and recognize that such items reside in a memory (RAM, disk, etc.), thereby configuring the memory. One of skill will also recognize that this innovation disclosure discusses various algorithmic steps which are to be embodied in executable code in a given implementation, and that such code also resides in memory, and that it effectively configures any general-purpose processor which executes it, thereby transforming it from a general-purpose processor to a special-purpose processor which is functionally special-purpose hardware.

Accordingly, one of skill would not make the mistake of treating as non-overlapping items (a) a memory recited in a claim, and (b) a data structure or data value or code recited in the claim. Data structures and data values and code are understood to reside in memory, even when a claim does not explicitly recite that residency for each and every data structure or data value or piece of code mentioned. Accordingly, explicit recitals of such residency are not required. However, they are also not prohibited, and one or two select recitals may be present for emphasis, without thereby excluding all the other data values and data structures and code from residency. Likewise, code functionality recited in a claim is understood to configure a processor, regardless of whether that configuring quality is explicitly recited in the claim.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as acquiring, attempting, attesting, building, comparing, detecting, determining, fetching, finding, getting, ignoring, obtaining, producing, reading, releasing, reporting, rewriting, securing, testing, validating (and, acquires, acquired, attempts, attempted, etc.) with regard to a destination or other subject may involve intervening action such as the foregoing or forwarding, copying, uploading, downloading, encoding, decoding, compressing, decompressing, encrypting, decrypting, authenticating, invoking, and so on by some other party, including any action recited in this document, yet still be understood as being performed directly by the party of interest.

Whenever reference is made to data or instructions, it is understood that these items configure a computer-readable memory and/or computer-readable storage medium (a.k.a. storage memory or storage device), thereby transforming it to a particular article, as opposed to simply existing on paper, in a person's mind, or as a mere signal being propagated on a wire, for example. For the purposes of patent protection in the United States, a memory or other computer-readable storage medium is not a propagating signal or a carrier wave or mere energy outside the scope of patentable subject matter under United States Patent and Trademark Office (USPTO) interpretation of the In re Nuijten case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly and individually described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

100 operating environment, also referred to as computing environment
102 computer system, also referred to as a "computational system" or "computing system", and when in a network may be referred to as a "node"
104 users, e.g., user of an enhanced system 200
106 peripherals
108 network generally, including, e.g., LANs, WANs, software-defined networks, clouds, and other wired or wireless networks
110 processor
112 computer-readable storage medium, e.g., RAM, hard disks; also referred to broadly as "memory", which may be volatile or nonvolatile, or a mix
114 removable configured computer-readable storage medium
116 instructions executable with processor; may be on removable storage media or in other memory (volatile or nonvolatile or both)
118 data
120 kernel(s), e.g., operating system(s), BIOS, UEFI, device drivers
122 tools, e.g., anti-virus software, firewalls, packet sniffer software, intrusion detection systems, intrusion prevention systems, other cybersecurity tools, debuggers, profilers, compilers, interpreters, decompilers, assemblers, disassemblers, source code editors, auto-completion software, simulators, fuzzers, repository access tools, version control tools, optimizers, collaboration tools, other software development tools and tool suites (including, e.g., integrated development environments), hardware development tools and tool suites, diagnostics, and so on
124 applications, e.g., word processors, web browsers, spreadsheets, games, email tools, commands
126 display screens, also referred to as "displays"
128 computing hardware not otherwise associated with a reference number 106, 108, 110,
200 provenance validation flow example; may also refer to a system 102 enhanced to implement such a flow
202 release build; may refer to a computational act of building a release binary, or to a milestone in a work flow
204 provenance validation build; may refer to a computational act of building a provenance validation binary, or to a milestone in a work flow
206 release binary; a digital artifact
208 parts used in release build; digital artifacts
210 symbol information for variables, methods, and other digital artifacts in a binary
212 context used in release build; digital artifacts
214 software testing generally
216 software release; may refer to act of releasing software for specified or general use, or to the software thus released
218 provenance manifest; a digital artifact
220 candidate binary; a digital artifact; may or may not be a partial or complete copy of the release binary
222 candidate parts used in provenance build; digital artifacts
224 context used in provenance build; digital artifacts
226 validation binary; a digital artifact; may or may not be a partial or complete copy of the release binary or the candidate binary or both
228 provenance attestation; a digital artifact representing and memorializing one or more results of an attempt to validate provenance 230 rewrite of a binary; may refer to act of rewriting (modifying, enhancing) a binary or to the result of such act 302 manifest checksum, e.g., a digital value which is generated from content of an item (a manifest 218, in this case) such that any change in the content results in a different value for the checksum 304 program part information, e.g., file content checksums, file names 306 source code file; a digital artifact 308 source code file name 310 source code file content checksum 312 library file; a digital artifact 314 library file name 316 library file content checksum 318 resource file; a digital artifact 320 resource file name 322 resource file content checksum 324 compiler; a software development tool; an interpreter or assembler may be considered a type of compiler for present purposes 326 compiler name; may include authoritative copy location 328 compiler version; some versions also include checksums 330 compiler parameter, e.g., command line parameter or environment variable 332 build tool, e.g., linter, code generator, linker, deployer, source code analyzer, etc.

334 build tool name; may include authoritative copy location 336 build tool version; some versions also include checksums 338 build tool parameter, e.g., command line parameter or environment variable 340 kernel context parameter or setting 342 kernel context information, e.g., kernel name, version, authoritative copy location 344 tamper detector, e.g., software that generates and compares checksums; may also check audit logs 346 runtime software 348 runtime name; may include authoritative copy location 350 runtime version; some versions also include checksums 352 manifest digital signature; may be treated as a manifest checksum 354 operating system software 356 operating system name; may include authoritative copy location 358 operating system version; some versions also include checksums 362 rewrite provenance manifest; an example of a manifest 218 that is specific to one or more rewrite operations and their binary result(s)

364 repository URI or other part storage location identifier 366 environment variable; a digital artifact 368 debugger file, e.g., a PDB file or another file that includes symbol information 210

402 intermediate language; a digital artifact 404 assembly language; a digital artifact 406 file timestamp; a digital artifact 408 executable code; a digital artifact 410 software routine; a digital artifact 412 metadata; a digital artifact 414 certification signature; a digital artifact 416 file generally; a digital artifact 418 file access permission; a digital artifact 500 flowchart; 500 also refers to provenance validation methods illustrated by or consistent with the FIG. 5 flowchart 502 computationally acquire a provenance manifest, e.g., using file read, network transmission, API call, etc.

504 computationally get a candidate binary, e.g., using file read, network transmission, API call, etc.

506 computationally obtain a candidate item such as a candidate part 222 or candidate context 224, e.g., using file read, network transmission, API call, etc.

508 computationally attempt to build a validation binary, e.g., by obtaining 506 parts and context, comparing checksums of obtained items to checksums of corresponding entries in manifest, running compiler, running build tools, etc.

510 computationally build a binary, e.g., by running compiler, running build tools, etc.

512 computationally produce a provenance attestation 600 flowchart; 600 also refers to provenance validation methods illustrated by or consistent with the FIG. 6 flowchart (which incorporates the steps of FIG. 2 and FIG. 5)

602 computationally compare two binaries; may be bitwise; may ignore certain aspects (e.g., certification signature, timestamp, file permission) as taught herein 604 computationally secure a manifest, e.g., with a checksum 606 computationally find an indication of (a) non-deterministic compilation, e.g., by checking compiler version list that identifies non-deterministic behaviors, or (b) inaccessibility, e.g., lack of repo URI for part, lack of authoritative version location for compiler or build tool or runtime or operating system 608 compilation, e.g., act of running a compiler or interpreter or assembler or other code generator 610 inaccessibility of an artifact; occurs, e.g., when artifact is stored only in non-public local storage, or when necessary credentials to access artifact are unavailable 612 computationally detect possible tampering, e.g., by comparing checksums 614 tampering, e.g., unauthorized modification of a digital artifact, or corruption of a digital artifact 616 computationally determine that two checksums which should match do not match, indicating undesired content difference 618 computationally read a URI or other part location 620 computationally obtain a candidate part 222, e.g., using file read, network transmission, API call, etc.

622 computationally ignore an item, e.g., by not making a comparison of item instances, or by not relying on a lack of difference in item instances in order to attest that provenance is valid 624 computationally report data, e.g., on screen, in email, in a printout, or another human-legible format 626 result of a comparison; a digital artifact; may be "match" or "no match", may also indicate details as to why no match was found, or what was ignored to find a match 628 any step discussed in the present disclosure that has not been assigned some other reference numeral

CONCLUSION

In short, the teachings herein provide a variety of provenance validation functionalities which operate in enhanced systems. Software provenance validation reports 624 whether a validation binary 226 matches the source code 306, resources 318, and other parts 208 specified in a provenance manifest 218 for a release binary 206, as well as the compiler 324, runtime 346, operating system 354, and other context 212, which is specified in the provenance manifest 218. Part context checksums 310, 316, 322, software versions 328, 336, 350, 358, tool 324, 332 parameters 330, 338, and other aspects 302, 352, 366 of a build 510 are checked 600. Certification signatures 414, timestamps 406, certain version differences, source code locations, and other data 118 may be ignored 622 for validation purposes. A provenance manifest 218 may include other provenance manifests 218, including binary rewrite 230 manifests 218. The provenance manifest 218 may be stored in a debugger file 368 with symbol information 210, or be stored separately. Partial matches may be reported 624, with details 626 of what matches or does not match. After provenance of a binary is validated, the binary's source code 306 can be analyzed for vulnerabilities, thereby enhancing software supply chain security.

Embodiments are understood to also themselves include or benefit from tested and appropriate security controls and privacy controls such as the General Data Protection Regulation (GDPR), e.g., it is understood that appropriate measures should be taken to help prevent misuse of computing systems through the injection or activation of malware. Use of the tools and techniques taught herein is compatible with use of such controls.

Although Microsoft technology is used in some motivating examples, the teachings herein are not limited to use in technology supplied or administered by Microsoft. Under a suitable license, for example, the present teachings could be embodied in software or services provided by other cloud service providers.

Although particular embodiments are expressly illustrated and described herein as processes, as configured storage media, or as systems, it will be appreciated that discussion of one type of embodiment also generally extends to other embodiment types. For instance, the descriptions of processes in connection with FIGS. 2, 5, and 6 also help describe configured storage media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Those of skill will understand that implementation details may pertain to specific code, such as specific syntax, specific kinds of runtimes or programming languages or architectures, specific scripts or other tasks, and specific computing environments, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

With due attention to the items provided herein, including technical processes, technical effects, technical mechanisms, and technical details which are illustrative but not comprehensive of all claimed or claimable embodiments, one of skill will understand that the present disclosure and the embodiments described herein are not directed to subject matter outside the technical arts, or to any idea of itself such as a principal or original cause or motive, or to a mere result per se, or to a mental process or mental steps, or to a business method or prevalent economic practice, or to a mere method of organizing human activities, or to a law of nature per se, or to a naturally occurring thing or process, or to a living thing or part of a living thing, or to a mathematical formula per se, or to isolated software per se, or to a merely conventional computer, or to anything wholly imperceptible or any abstract idea per se, or to insignificant post-solution activities, or to any method implemented entirely on an unspecified apparatus, or to any method that fails to produce results that are useful and concrete, or to any preemption of all fields of usage, or to any other subject matter which is ineligible for patent protection under the laws of the jurisdiction in which such protection is sought or is being licensed or enforced.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole. Distinct steps may be shown together in a single box in the Figures, due to space limitations or for convenience, but nonetheless be separately performable, e.g., one may be performed without the other in a given performance of a method.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a", "an", and "the" are inclusive of one or more of the indicated item or step. In particular, in the claims a reference to an item generally means at least one such item is present and a reference to a step means at least one instance of the step is performed. Similarly, "is" and other singular verb forms should be understood to encompass the possibility of "are" and other plural forms, when context permits, to avoid grammatical errors or misunderstandings.

Headings are for convenience only; information on a given topic may be found outside the section whose heading indicates that topic.

All claims and the abstract, as filed, are part of the specification.

To the extent any term used herein implicates or otherwise refers to an industry standard, and to the extent that applicable law requires identification of a particular version of such as standard, this disclosure shall be understood to refer to the most recent version of that standard which has been published in at least draft form (final form takes precedence if more recent) as of the earliest priority date of the present disclosure under applicable patent law.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A computing system equipped for software provenance validation, the computing system comprising:
   a digital memory; and
   a processor in operable communication with the digital memory, the processor configured to perform software provenance validation steps which include (a) acquiring a provenance manifest and getting a candidate binary, (b) obtaining at least one candidate item, (c) attempting to build a validation binary based on the provenance manifest and the at least one candidate item, (d) when the attempting yields a success in building the validation binary, comparing the validation binary to the candidate binary, and producing a provenance attestation according to a result of comparing the binaries, (e) when the attempting yields a failure to build the validation binary, producing the provenance attestation according the failure, wherein the attempting yields the failure at least partially in response to finding an indication of at least one of the following: use of a non-deterministic compiler, use of a local storage to store a program part, storage of a program part outside of any publicly accessible location, or storage of a program part outside of any internet-accessible repository.

2. The system of claim 1, wherein the provenance manifest includes:
   (a) at least one of the following kinds of program part information: a source code file name and content checksum, a library file name and content checksum, or a resource file name and content checksum;
   (b) at least one of the following kinds of build tool context information: a compiler name and version, a compiler parameter, a build tool name and version, or a build tool parameter; and
   (c) at least one of the following kinds of kernel context information: a runtime name and version, or an operating system name and version.

3. The system of claim 1, wherein the provenance manifest includes at least one of the following: a copy of a second provenance manifest, or a reference to the second provenance manifest, and wherein the provenance manifest and the second provenance manifest differ from each other with respect to at least one of the following: program part information, build tool context information, or kernel context information.

4. The system of claim 1, wherein the provenance manifest includes a rewrite provenance manifest that describes a binary rewrite operation, and the rewrite provenance manifest is secured by at least one of the following: a checksum, a digital signature, or a tamper detection mechanism.

5. The system of claim 1, wherein the provenance manifest resides in a file which is secured by at least one of the following: a checksum, a digital signature, or a tamper detection mechanism.

6. The system of claim 1, wherein the provenance manifest resides in a debugging file which also contains symbol information.

7. A method for software provenance validation, the method comprising:
   acquiring a digital provenance manifest, wherein the digital provenance manifest resides in a file which is secured by at least one of the following: a checksum, a digital signature, or a tamper detection mechanism;
   getting a candidate binary;
   obtaining at least one digital candidate item;
   attempting to computationally build a validation binary based on the provenance manifest and the at least one candidate item, the attempting yielding either a success or a failure;
   when the attempting yields a success in building the validation binary, computationally comparing the validation binary to the candidate binary, and producing a digital provenance attestation according to a result of comparing the binaries; and
   when the attempting yields a failure to build the validation binary, producing the digital provenance attestation according the failure.

8. The method of claim 7, wherein the attempting yields the failure in response to detecting an indication of tampering with the provenance manifest.

9. The method of claim 7, wherein the attempting yields the failure at least partially in response to finding an indication of at least one of the following:
   use of a non-deterministic compiler;
   use of a local storage to store a program part;
   storage of a program part outside of any publicly accessible location; or
   storage of a program part outside of any internet-accessible repository.

10. The method of claim 7, wherein the attempting yields the failure in response to determining that the digital candidate item has a content checksum that does not match the provenance manifest.

11. The method of claim 7, wherein obtaining at least one digital candidate item comprises reading from the provenance manifest a location of the digital candidate item, and fetching the digital candidate item from the location.

12. The method of claim 7, wherein attempting to computationally build a validation binary avoids reliance on a stated location of the digital candidate item.

13. The method of claim 7, wherein the attempting yields a success and wherein comparing the validation binary to the candidate binary avoids reliance on comparison of any certification signature of either binary.

14. The method of claim 7, wherein the attempting yields a success and wherein comparing the validation binary to the candidate binary ignores timestamps and ignores file access permissions.

15. The method of claim 7, wherein the attempting ignores a difference in two compiler versions in response to ascertaining that both compiler versions are known to generate equivalent code for at least a portion of the candidate binary and the validation binary.

16. A computer-readable storage device configured with data and instructions which upon execution by a processor cause a computing system to perform a method for software provenance validation, the method comprising:
    acquiring a digital provenance manifest;
    getting a candidate binary;
    obtaining at least one digital candidate item, wherein obtaining at least one digital candidate item comprises reading from the digital provenance manifest a location of the digital candidate item, and fetching the digital candidate item from the location;
    attempting to computationally build a validation binary based on the provenance manifest and the at least one candidate item, the attempting yielding either a success or a failure;
    when the attempting yields a success in building the validation binary, computationally comparing the validation binary to the candidate binary, and producing a digital provenance attestation according to a result of comparing the binaries; and
    when the attempting yields a failure to build the validation binary, producing the digital provenance attestation according the failure.

17. The storage device of claim 16, wherein the attempting yields the failure, and the method further comprises reporting that the validation binary and the candidate binary differ in at least one of the following: intermediate language, assembly language, executable code, metadata, or symbol information.

18. The storage device of claim 16, wherein the attempting yields the failure, and the method further comprises reporting that the validation binary and the candidate binary are the same in at least one of the following: intermediate language, assembly language, executable code, metadata, or symbol information.

19. The storage device of claim 16, wherein the attempting yields the failure, and the method further comprises reporting that the validation binary and the candidate binary differ in a particular candidate part file, and reporting a name of the particular candidate part file.

20. The storage device of claim 16, wherein the attempting yields the failure, and the method further comprises reporting that the validation binary and the candidate binary differ in that one of the binaries contains a routine that is not present in the other one.

* * * * *